A. B. WETHERELL.
SELF FILLING TIRE.
APPLICATION FILED FEB. 13, 1912.
1,134,361.
Patented Apr. 6, 1915.
2 SHEETS—SHEET 1.
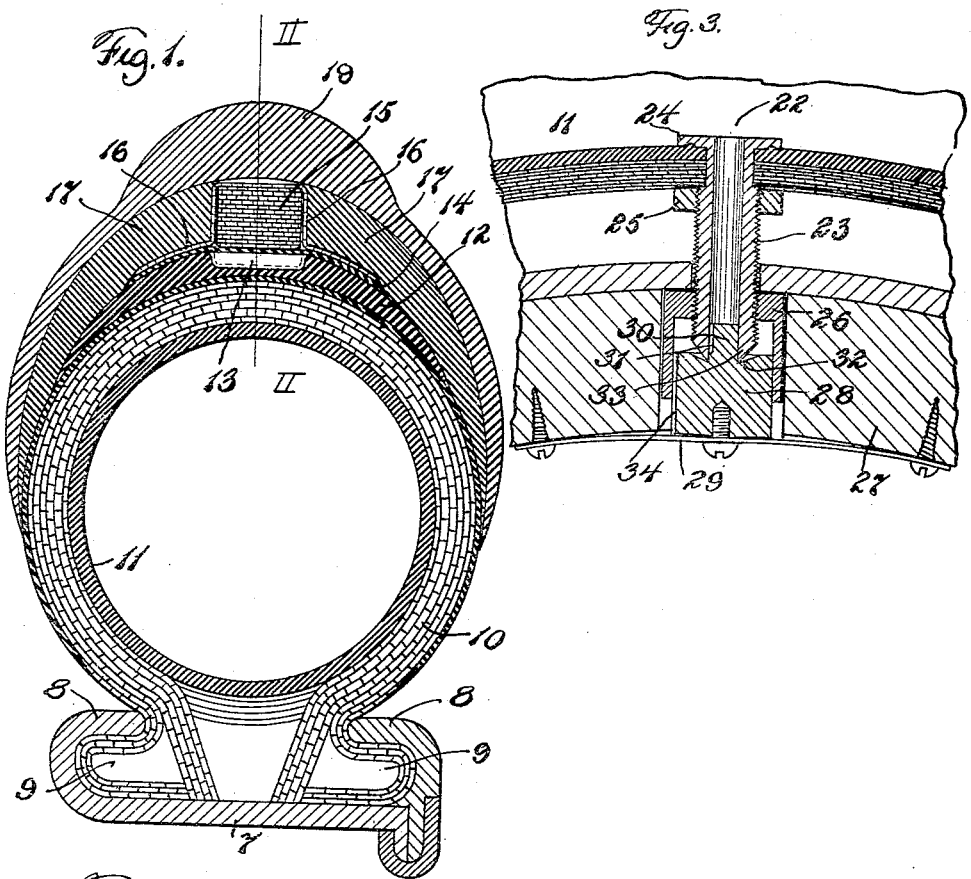
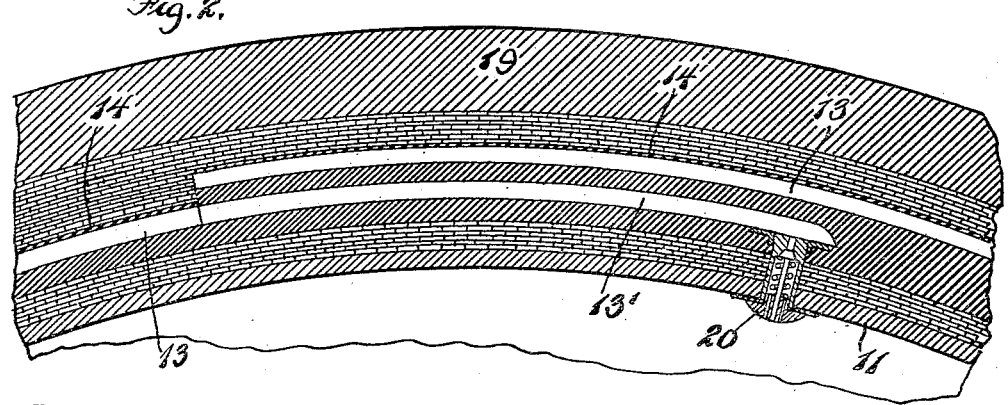
WITNESSES:
INVENTOR.
BY
ATTORNEY.

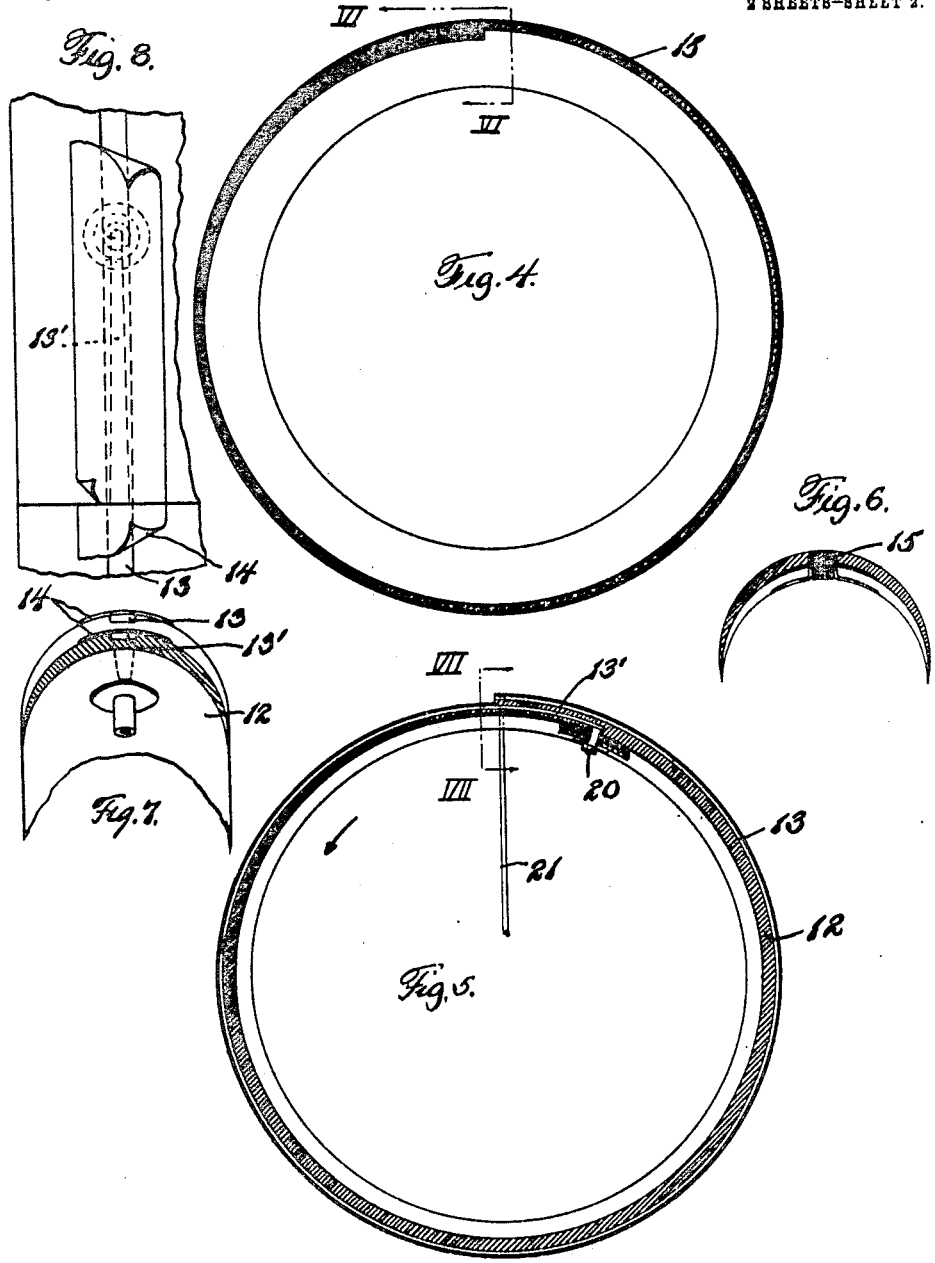

UNITED STATES PATENT OFFICE.

ANSON B. WETHERELL, OF PITTSBURGH, PENNSYLVANIA.

SELF-FILLING TIRE.

1,134,361.  Specification of Letters Patent.  Patented Apr. 6, 1915.

Application filed February 13, 1912.  Serial No. 677,394.

*To all whom it may concern:*

Be it known that I, ANSON B. WETHERELL, a citizen of the United States, residing at Pittsburgh, in the county of Allegheny and State of Pennsylvania, have invented certain new and useful Improvements in Self-Filling Tires, of which the following is a specification.

This invention relates to self-filling tires for automobiles, bicycles, and similar vehicles employing pneumatic tires, and it has for its primary objects; the provision of an improved apparatus for filling the tire as the wheel rotates; and the provision in a device of the character specified, of an improved valve mechanism for automatically maintaining the pressure at a predetermined amount. These together with such other objects as may hereinafter appear, or are incidental to the invention, are attained by means of a construction illustrated in preferred form in the accompanying drawings, wherein Fig. 1 is a transverse section through an automobile tire embodying my invention; Fig. 2 is a longitudinal section on the line II—II of Fig. 1; Fig. 3 is a section through the safety valve mechanism employed; Fig. 4 is a longitudinal section through the compressor element of the tire; Fig. 5 is a similar section through the compression element of the tire; Fig. 6 is a section on the line VI—VI of Fig. 4; Fig. 7 is a section on the line VII—VII of Fig. 5; and Fig. 8 is a plan view of Fig. 7.

While my invention may be used on various types of pneumatic tires, I have shown it in the drawings as applied to an automobile tire, the parts being drawn out of proportion for the purpose of clearness. Referring to Fig. 1, I have shown a rim 7 provided with flanges 8 adapted to grip the flanges 9 formed on the carcass 10 of the shoe. Mounted within the carcass is the usual inner tube 11. Vulcanized on the carcass is an annular band or strip 12 of rubber provided with a channel or groove 13, which extends circumferentially around the strip and has its ends overlapping as indicated in Fig. 2. A sheet 14, preferably composed of a fine quality of rubber, is laid over the strip 12 and vulcanized thereto. This sheet covers the channel 13. Mounted immediately above the channel 13 and sheet 14 is a compressor member 15 which is preferably composed of layers of fabric, such for example as tape. The outer top strip 16 of the tape extends on either side of the compressor member 15 and is held in position by means of rubber walls 17, which are vulcanized in position over such strip, the annular strip 12 and the carcass 10, as is clearly seen from an inspection of Fig. 1. It will be observed that the edges of the compressor member 15 do not quite abut the outer strip 16 and walls 17, the purpose of which will hereinafter appear. The tire is covered and protected by the usual tread member 18, which in this case, however, is provided with an annular ridge portion 19. From an inspection of Figures 4 and 5 it will be seen that the strip 12 which is provided with the channel 13 has its outside edge formed somewhat in the nature of a spiral to make provision for the overlapping ends of the channel. The inner portion of the strip 12 is circular in form. The inside edge of the compressor member is formed to fit the compression member or strip 12, and the outer edge is of circular form, the purpose of which is to provide an even tread on the compression member as the wheel rotates.

From an inspection of Fig. 2 it will be seen that the inner end 13' of the channel 13 opens into a check valve 20 secured to the inner tube 11. The outer end of the channel 13 is connected to an intake pipe 21 which is preferably fastened to the hub of the wheel, as diagrammatically indicated in Fig. 5.

The operation of the device is as follows, assuming that the wheel is turning in the direction indicated by the arrow in Fig. 5. When the outer end of the channel is adjacent the ground the weight of the vehicle compresses the ridge 19 and forces the compressor member 15 inwardly, which in turn moves the strip 14 into the channel 13 and thereby closes the end of the channel from communication with the intake pipe 21. As the wheel rotates the air confined within the channel is driven or forced around until it reaches the end 13', at which time the wheel has made a complete revolution and the outer end of the channel is again adjacent the ground. The arrangement of overlapping ends prevents the escape of any air that has been confined within the channel and continually adds a fresh supply taken in by the channel as the wheel rotates. When the air contained within the channel is compressed sufficiently it will force its way through the check valve 20 into the inner tube 11.

In order to prevent the pressure within the inner tube from rising above a predetermined amount, I have provided a safety valve 22, which comprises the sleeve or stem 23 provided with a collar 24, which is adapted, in conjunction with the nut 25 threaded on the sleeve, to serve as a means for securing the sleeve to the inner tube 11. Threaded on the end of the sleeve is a bushing 26 which is embedded in the felly 27 of the wheel of the vehicle. Slidably mounted in the bushing is a piston 28 which is maintained in position in the bushing by the flat spring 29 secured to the inner edge of the felly. The piston 28 is provided with a reduced portion 30 fitting the inside of the sleeve 23 and having a groove or slot 31, and with a countersunk portion 32 to provide a seat for the end of the sleeve which is beveled at 33 to form a knife edge contact between the sleeve and seat. When the pressure within the inner tube is sufficient to overcome the resistance of the spring 29, the piston 28 is forced outwardly and the groove 31 is uncovered and the air escapes to the atmosphere through the groove 34 cut into the side of the piston. The form of valve employed is such as to insure a tight closure preventing the escape of the air confined within the inner tube when the vehicle is not in use.

The compressor member 15 is fastened at the top and has a comparatively loose fit with the rubber walls 17, so that it will be free to move inwardly when the ridge 19 is compressed as the wheel rotates. The provision of the overlapping ends of the channel 13 is advantageous in that any air that is in the channel cannot escape and will be driven around to the end 13', a small amount being added thereto with each revolution of the wheel, until a sufficient pressure is generated to open the check valve 20 against the pressure within the inner tube.

Having thus described my invention and illustrated its use, what I claim as new and desire to secure by Letters Patent, is the following:

1. A self inflating tire comprising in combination an outer casing, an inner tube, and a channel which is open to the atmosphere adjacent one end and to the inner tube adjacent the other end adapted to compress air to inflate the inner tube as the tire is rotated, said channel being tapered toward the end communicating with the inner tube.

2. In a self filling tire, the combination with an outer compressible casing, an inner tube mounted therein, a circumferential pumping channel lying in the outer casing and surrounding the inner casing, the ends of the said channel extending past each other and each lying outside the inner tube and exposed to the compressive action of the outer tube, and one of said ends communicating with the atmosphere in advance of the other end which communicates with the inner tube.

In testimony whereof I have hereunto signed my name in the presence of the two subscribed witnesses.

ANSON B. WETHERELL.

Witnesses:
HANEY L. LECHNER,
ARCHWORTH MARTIN.

Copies of this patent may be obtained for five cents each, by addressing the "Commissioner of Patents, Washington, D. C."